United States Patent [19]

Tai

[11] 4,363,106

[45] Dec. 7, 1982

[54] COMPUTATION MODULE FOR ADDITION AND MULTIPLICATION IN RESIDUE ARITHMETIC

[75] Inventor: Anthony M. Tai, Plymouth, Mich.

[73] Assignee: Environmental Research Institute of Michigan, Ann Arbor, Mich.

[21] Appl. No.: 177,954

[22] Filed: Aug. 13, 1980

[51] Int. Cl.³ .......... G06F 7/72

[52] U.S. Cl. .......... 364/746; 364/713

[58] Field of Search .......... 364/746, 713; 350/96.14

[56] References Cited

U.S. PATENT DOCUMENTS 3,996,455 12/1976 Schaefer et al. .......... 364/713

4,107,783 8/1978 Huang .......... 364/746

OTHER PUBLICATIONS

Psaltis & Casasent "Optical Residue Arithmetic: a Correlation Approach" *Applied Optics* vol. 18, No. 2, Jan. 15, 1979, pp. 163-171.

*Primary Examiner*—David H. Malzahn

*Attorney, Agent, or Firm*—Krass, Young & Schivley

[57] ABSTRACT

A computation module useful as part of a optical numerical computer based on the residue number system includes an M×N array of double input, double output electrically actuated optical switches. Optical pathways interconnect each of the outputs of the switches of a row of the array and certain inputs of the switches in the subsequent adjacent row. Each row of the array has an associated bi-stable electrical switch which is interconnected to all of the light switches in that row and causes such light switches to assume a common state dependent upon the state of the electrical switch. The module computes either the sum or product of two modulo M residues, depending upon its interconnection pattern. One of the residues is introduced as a light input to one of the electrical optical switches in the first row of the array. The other residue is operative to condition one of the bi-stable electrical switches to assume a different state than all of the other electrical switches. The output from the module is in the form of a light signal from one of the electro-optical switches in the last row of the array.

14 Claims, 14 Drawing Figures

COMPUTATION MODULE FOR ADDITION AND MULTIPLICATION IN RESIDUE ARITHMETIC

TECHNICAL FIELD

The present invention generally relates to numerical computers using optics, and deals more particularly with a multi-purpose, programmable computational module for performing addition and multiplication using the residue number system.

BACKGROUND ART

Residue arithmetic is one of the fastest numerical computing methods available due to its parallel arithmetic computational properties. Computation methods using residue arithmetic are particularly suited for implementation using optical processors arranged to operate on data using pipelining techniques. Optical numerical computers possess several advantages over electronic computers, including the inherent parallelism of optical systems, the possibility of wave length multiplexing, and the short propagation time of optical signals.

The residue number system is extremely well matched to optical computing systems due to the fact that no carry mechanism is needed in residue arithmetic. This allows all the computations to be performed in parallel, without the need for interconnection between the results of sub-calculations until the final decoding step, which returns the calculation results to a more conventional number system. Also, the residue number system decomposes a calculation into sub-calculations of smaller computational complexity. Once a calculation requiring a large dynamic range is decomposed into segments that can be handled directly by conventional analog methods, the full advantage of parallel processing using optical computer systems can be utilized to handle these segments.

Optical processors using special maps to perform residue arithmetic implemented by optical processors is known per se in the art. See, for example, "Optical Computation Using Residue Arithmetic", by HUANG, et al, *Applied Optics*, Vol. 18, No. 2, Jan. 15, 1979. As mentioned previously, the main characteristic of the residue number system is that there are no carries, thus all of the columns of a calculation can be processed in parallel. The residue number system is based upon N fixed, prime integers $m_1, m_2, \ldots, m_N$, which are called moduli. For example, for a residue number system based on moduli 2, 3, 5 and 7, an integer number $X=14$ can be represented as $14=(R_1, R_2, R_3, R_4)=(0, 2, 4, 0)$, that is, a number represented by the series of integers which constitute the remainders, or residues when that number is divided by each of the chosen moduli of the residue number system.

In the performance of basic arithmetic operations, computations with respect to each of the residues may be carried out independently because of the absence of carry as noted above. For example, in the addition of two numbers in the residue number system, the two residues of each modulus are added and the residue representation of the sum of the two numbers will simply be the ensemble of the sums of the individual residues. That is, if $(A_1, A_2, \ldots, A_N)$ and $(B_1, B_2, \ldots, B_N)$ are the residue representations of A and B, respectively, then $A+B=(A_1+B_1), (A_2+B_2), \ldots, (A_N+B_N)$. Subtraction and multiplication operations are equally simple, while division is more difficult in the residue number system and generally involves several steps. Effort is usually made to structure algorithms so as to avoid the necessity for division.

Because the residues which collectively constitute a numerical representation in the residue number system may be processed separately to generate partial functions which collectively constitute the numerical representation of an arithmetic function of two input numerical representations, an arithmetic processor for residue numbers may be constructed from a plurality of modules, each of which operates on a single residue in the numerical representation of a number being arithmetically processed. Since the non-divisional processing of each residue only requires a single step, and no carries are involved, the entire arithmetic operation can be performed in a single step, with the output of each of the processor modules providing one residue representation of the output of the processor.

In residue arithmetic, the functions of varying numbers are cyclical. That is, the residue for a single modulus ranges between zero and one less than that modulus. This feature allows the use of maps to generate the functions of a given arithmetic operation of a variable residue. The input to the map is a signal representative of a variable residue and the output signal is a representation of the function of the input and the given operation. For example, the truth table for $A+4=C$ modulo 5 is:

| A | C |
|---|---|
| 0 | 4 |
| 1 | 0 |
| 2 | 1 |
| 3 | 2 |
| 4 | 3 |

This can be implemented in the two dimensional map shown in FIG. 1*a*. Electronic computers based on hardware or software maps of this type have required a look-up table or some form of external logic for the selection of the appropriate map. After the map is selected for the desired function, the map is then implemented optically, electro-optically or electronically.

The use of look-up tables or additional decision logic for the selection of the appropriate map substantially adds to total computational time. Optical implementation of the mapping concept mentioned above has the benefit of increasing computational speed, however, those prior art optical systems proposed for implementing the mapping technique lack flexibility and are rather complicated in their approach to selecting and programming the maps.

Accordingly, it is a primary object of the present invention to provide a multi-purpose, programmable computational module for use with a numerical optical computer which enables addition and multiplication operations to be performed in residue arithmetic in a single electronic switching step without the need for external logic or look-up tables.

A further object of the invention is to provide a computational module of the type mentioned above which can be interconnected for performing chain calculations.

Another object of the invention is to provide a computational module of the type mentioned above which reduces overall computation time and is particularly simple in construction, but yet is highly flexible to allow interconnection with other computational modules in order to allow execution of complex mathematical functions using the residue arithmetic system.

A still further object of the invention is to provide a computational module in which the input, output and program controls are all similarly represented in the form of spatial positions, thereby defining a spatial map inherent in the module for executing a particular mathematical function.

Another object of the invention is to provide a module as described above which may be easily programmed by means of electric pulses, and in which computations are carried out by the propagation of light pulses.

BRIEF DESCRIPTION OF THE DRAWINGS

In the drawings, which form an integral part of the specification and are to be read in conjunction therewith, and in which like components are designated by like reference numerals in the various views.

BEST MODE FOR CARRYING OUT THE INVENTION

Figure 2A:
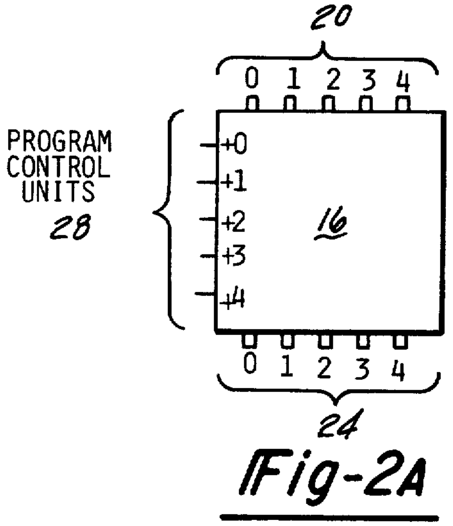
FIGS. 2*a* and 2*b* are diagrammatic views for the adder and multiplier modules forming the preferred embodiment of the present invention.
Figure 2B:
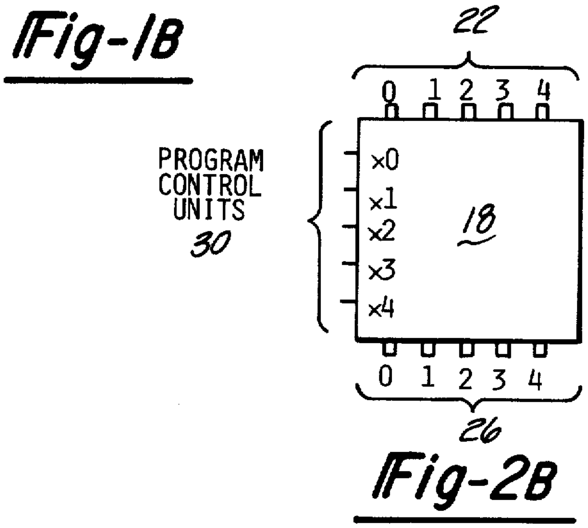

Referring first to FIGS. 2*a* and 2*b*, an addition and multiplication module 16 and 18 respectively have corresponding light inputs 20 and 22, as well as associated light outputs 24 and 26. Additionally, the modules 16 and 18 have corresponding electric program control inputs 28 and 30. As particularly shown in FIGS. 2*a* and 2*b*, addition and multiplication modules 16 and 18 are particularly adapted for executing addition and multiplication operations in the residue number system for the modulus 5. Thus, each of the light inputs 20 and 22, as well as the light outputs 24 and 26 correspond to the number 0–4, while each of the program control inputs 28 and 30 also correspond to the numbers 0–4.

A light pulse input on any of the light inputs 20 or 22 is shifted by the corresponding module 16 or 18 by a preselected number of positions and is output in accordance with the programming of the module on one of the outputs 24 or 26 as determined by the state of the corresponding control inputs 28 or 30. The internal configuration of the modules 16 and 18 is such that spatial maps corresponding to a particular modulus are formed integral therewith. The values of the light inputs and outputs, as well as the programming control inputs are represented by either a high or low signal, that is a high or low pulse into or out of the corresponding spatial input/output position. In this manner, the input, output and programming controls are all represented spatially in the same way thereby allowing interconnection of the modules 16 and 18 in a desired manner for performing preselected sequential operations. Thus, outputs of one module can be connected directly to the inputs of the next module, or a module can be employed to program the map of the next module, as is illustrated in FIG. 3.

Figure 3:
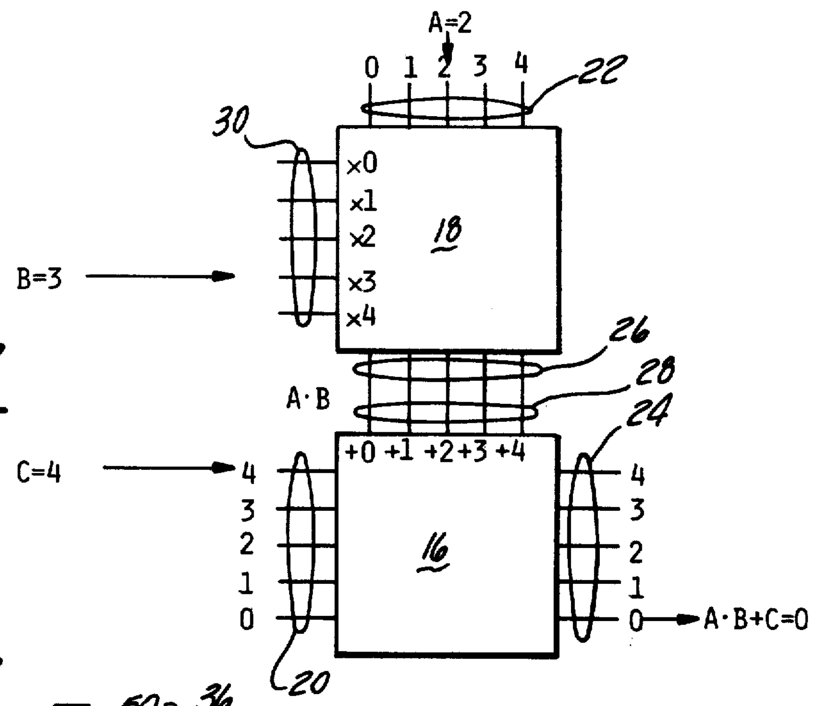
FIG. 3 is a diagrammatic view of an adder and multiplier module according to FIGS. 2*a* and 2*b*, for performing computation of A×B+C, for the case of modulus 5, wherein A=2, B=3, and C=4.

As shown in FIG. 3, the light outputs 26 of module 18 form the program control inputs 28 of the module 16. The arrangement shown in FIG. 3 is particularly adapted to compute the function A×B+C for the case of modulus 5. Thus, assuming, for illustrative purposes, that A=2, B=3, and C=4, light pulses are input on the number 2 input of inputs 22, and an electric pulse is input on lead number 3 of the program control inputs 30. Additionally, a light pulse is input on the number 4 input of light inputs 20 of module 16. The inputs to computation module 18 automatically produce an output on the number 1 output of lines 26 which represents a spatial position for the computation of A×B. The appropriate map inherently programmed in the computation module 16 is automatically selected by the spatial position of the corresponding input residue number on input line 28, without the use of look-up tables or logic elements.

Figure 4:
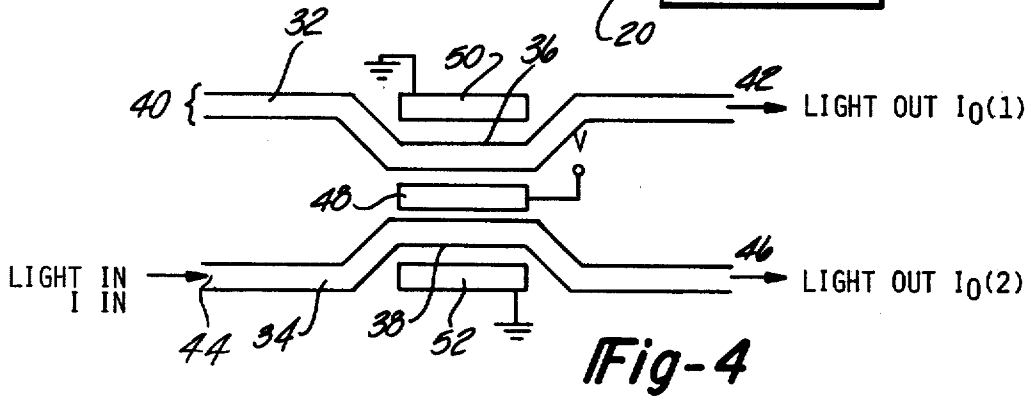
FIG. 4 is a diagrammatic representation of a directional coupling wave guide switch for use in implementing the modules depicted in FIGS. 2*a* and 2*b*.

The computational modules 16 and 18 are constructed using a plurality of directional coupling wave guide switches, one of such switches being shown in detail in FIG. 4. Two synchronous wave guides 32 and 34 particularly adapted to carry light waves include offset sections 36 and 38 respectively disposed in light coupling relationship to each other over a predefined coupling length. Wave guide 32 includes a light input and output 40 and 42 respectively, while wave guide 34, likewise has an input 44 and output 46 respectively. A main electrode 48 coupled with a source of voltage V is disposed between the offset sections 36 and 38 of the wave guides 32 and 34, while a pair of grounded electrodes 50 and 52 are disposed on respective opposite sides of the offset sections 36 and 38, such that the offset section 36 of wave guide 32 is disposed between the electric field of electrodes 48 and 50, while the offset section 38 of wave guide 34 is disposed between the electrodes 48 and 52. In operation, complete power transfer normally occurs between wave guides 32 and 34 at the offset sections 36 and 38 in the absence of a voltage being applied to electrode 48. Thus, in the absence of a potential between the electrodes 48, 50 and 52, a light pulse delivered to the input 40 of wave guide 32 is transferred at the offset sections 36 and 38 to the wave guide 34 and is delivered to the output 46, while light input to the wave guide 34 at input 44 is transferred at offset sections 36 and 38 and is delivered to output 42 of the wave guide 32. The synchronous operation of the wave guide switch is interrupted when a voltage is applied to electrode 48. More particularly, when a voltage is applied to electrode 48, thereby creating a field between electrode 48 and ground electrodes 50 and 52, power transfer between the wave guides 32 and 34 at the offset sections 36 and 38 is prevented; thus, light delivered at input 40 is output at 42, rather than at 46, while light input to the wave guide 34 at input 44 is output at 46, rather than 42.

Figure 1A:
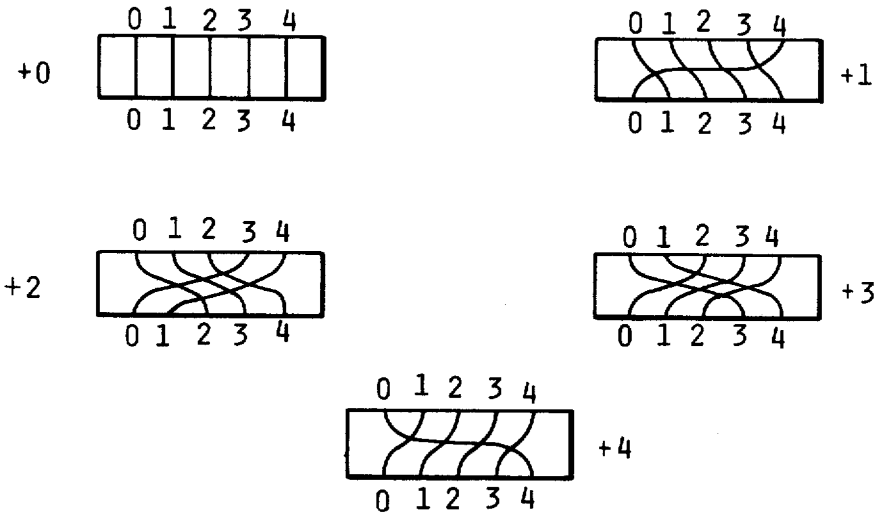
FIG. 1*a* is a diagrammatic representation of a series of spatial maps for performing addition operations in the residue number system for the modulus 5.
Figure 5:
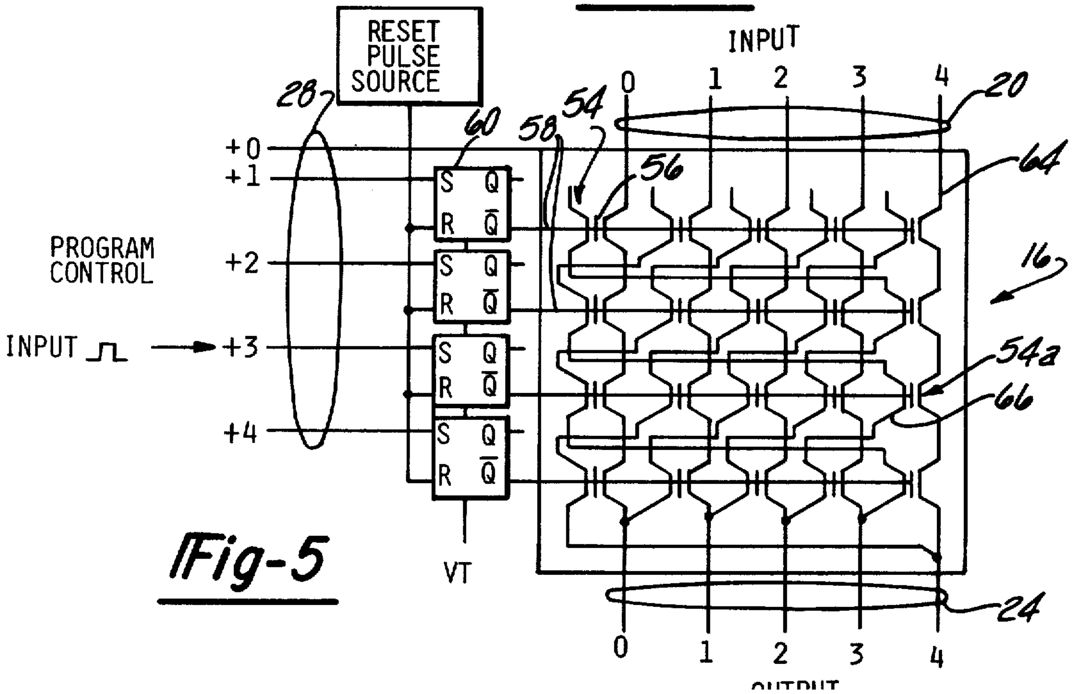
FIG. 5 is a detailed schematic and diagrammatic representation of the adder module shown in FIG. 2*a;*
Figure 6:
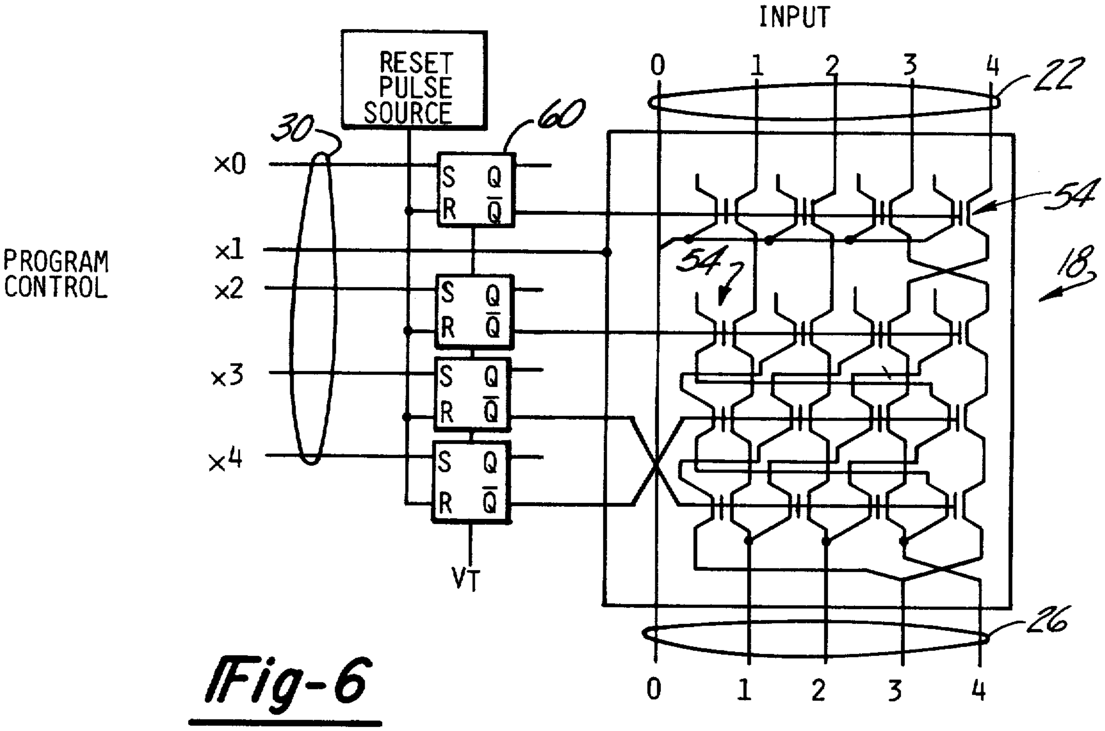
FIG. 6 is a combined schematic and diagrammatic representation of the multiplication module shown in FIG. 2*b;*
Figure 7:
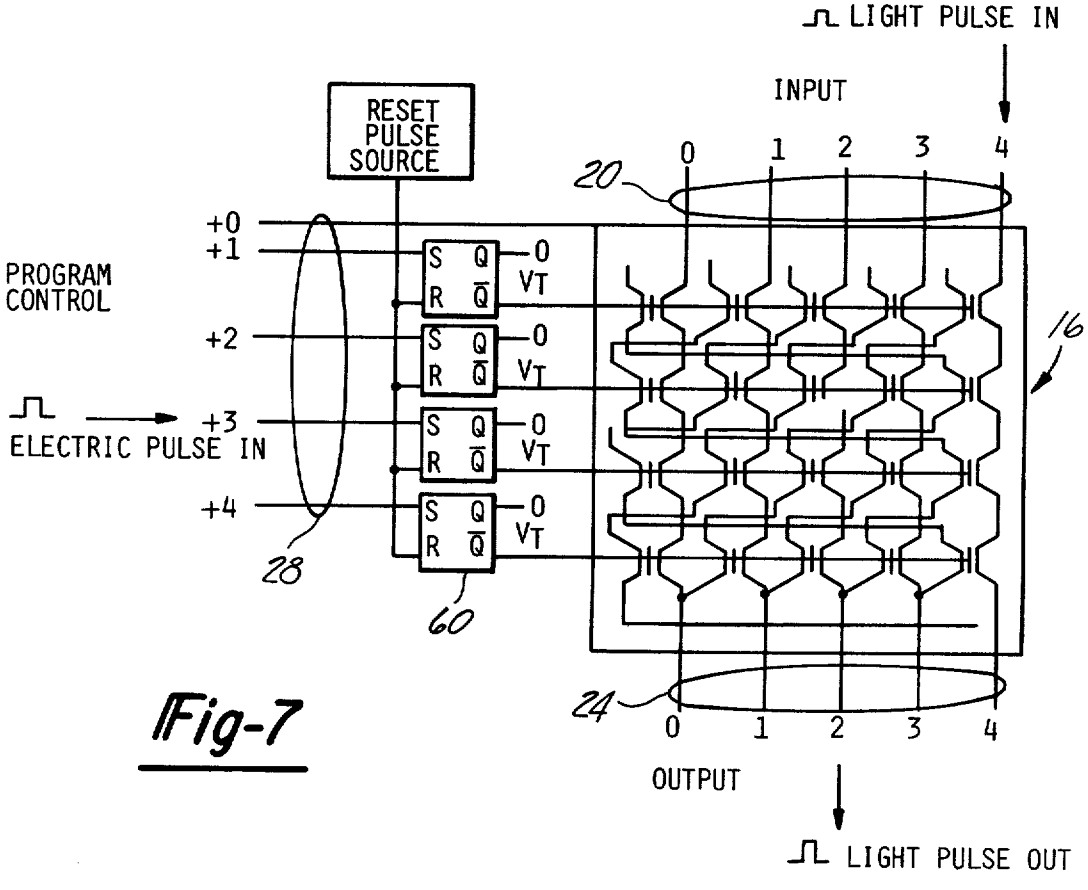
FIG. 7 is a view similar to FIG. 5 but showing the operation of the addition module for the computation of the addition of 4+3 for modulus 5.

One suitable design for implementing the addition computation module 16 shown in FIG. 2*a*, using the light switch of FIG. 4, is shown in FIG. 5. For sake of simplicity, the ground electrodes 50 and 52 shown in FIG. 4 have been deleted in FIG. 5. Similarly, FIG. 6 depicts one arrangement for implementing the multiplication computational module 18 shown in FIG. 2*b* using the light switch shown in FIG. 4. As shown in FIG. 5, the internal construction of the module 16 consists of a plurality of the optical wave guide switches shown in FIG. 4, one of same being indicated by the numeral 54. The light switches of computation module 16 are arranged in aligned rows and columns, with the wave guide of each switch being interconnected with the wave guides of neighboring switches in a predetermined arrangement in a manner to embody each of the maps shown in FIG. 1*a*. Only one of the wave guides of each of the switches in the upper row of module 16 is coupled to the light inputs 20, while the output of each wave guide of the switches in the last row thereof are coupled with the light outputs 24. The voltage applying electrode as at 56 of each row is connected by a common electrical line as at 58. A plurality of flip-flop devices 60, preferably of the RS type, are respectively associated with each row of the switches 54. The S input of each of the flip-flops 60 is operably coupled with one of the program control input lines 28 associated with a corresponding row of the switches 54, while the R inputs of the flip-flop 60 are connected to a suitable source of reset pulses 62. Each of the flip-flops 60 is connected with a voltage source $V_T$, while the $\overline{Q}$ output is coupled with the electrical line of 58 associated with the corresponding row of switches 54. Initially, each of the wave guide switches 54 is set at a voltage $V_T$, present on lines 58. In order to program the module 16 for addition, an electrical pulse is sent on the appropriate program control input line 28 to one of the flip-flops 60. The flip-flop 60 is responsive to the input pulse on its S input to remove the voltage $V_T$ from its $\overline{Q}$ output, thereby removing voltage from the associated line 58 to switch each of the switches 54 connected to the low-going line 58. An input residue number entered into the module 16 in the form of a light pulse on one of the inputs 20 propagates through the associated wave guide until it reaches the particular switch 54 which has been switched in accordance with the signal received on the program control lines 28. At this point, the input light pulse is coupled to an adjacent wave guide at the switch 54 whose state has been changed, and the light pulse continues to propagate through a continuous optical path until output on one of the output lines 24. The position where the light pulse exits from the outputs 24 corresponds to a particular sum. To illustrate the foregoing, assume that it is desired to add 4+3 for the modulus 5. In this case, the module 16 is first programmed to perform the function of +3 by delivering an electrical pulse to the +3 input of program control lines 28, which in turn is delivered to the S input of the associated flip-flop 60. The electrical pulse on the +3 input of lines 28 changes the state of the associated flip-flop 60, thereby removing voltage from the electrodes 56 of each of the switches 54 in the next to the bottom row thereof. A light pulse is then delivered to the number 4 input line of input lines 20. More particularly, this input light pulse is delivered on wave guide 64 to the optical switch 54*a*, where the light pulse is transferred to wave guide 66. The light pulse continues travelling through the wave guide 66 through an optical transmission path which outputs the light pulse on the number 2 output of output lines 24. The spatial position of the light pulse, namely at the number 2 position of the output lines 24, represents the residue of the sum of 4+3 for the modulus 5.

Figure 1B:
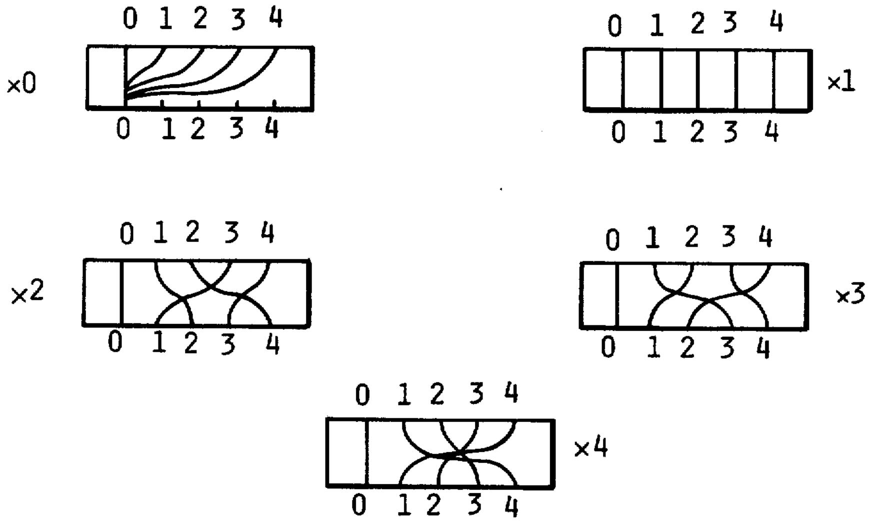
FIG. 1*b* is a diagrammatic representation, similar to FIG. 1*a* but showing spatial maps for performing multiplication operations for the modulus 5.

The multiplication module 18 shown in FIG. 6 is similar to that of module 16 shown in FIG. 5 with the following exceptions. The rows and columns of optical switches 54 have the wave guides thereof connected by optical transmission paths in a manner to simulate the combination of maps to perform multiplication operations for modulus 5 shown in FIG. 1*b*. Also, the row of optical switches 54 immediately below the top row thereof is deleted, along with the associated flip-flop 60 for that row. Otherwise, the components of the module 18 operate in a manner essentially identical to that described with reference to module 16 above.

Figure 8:
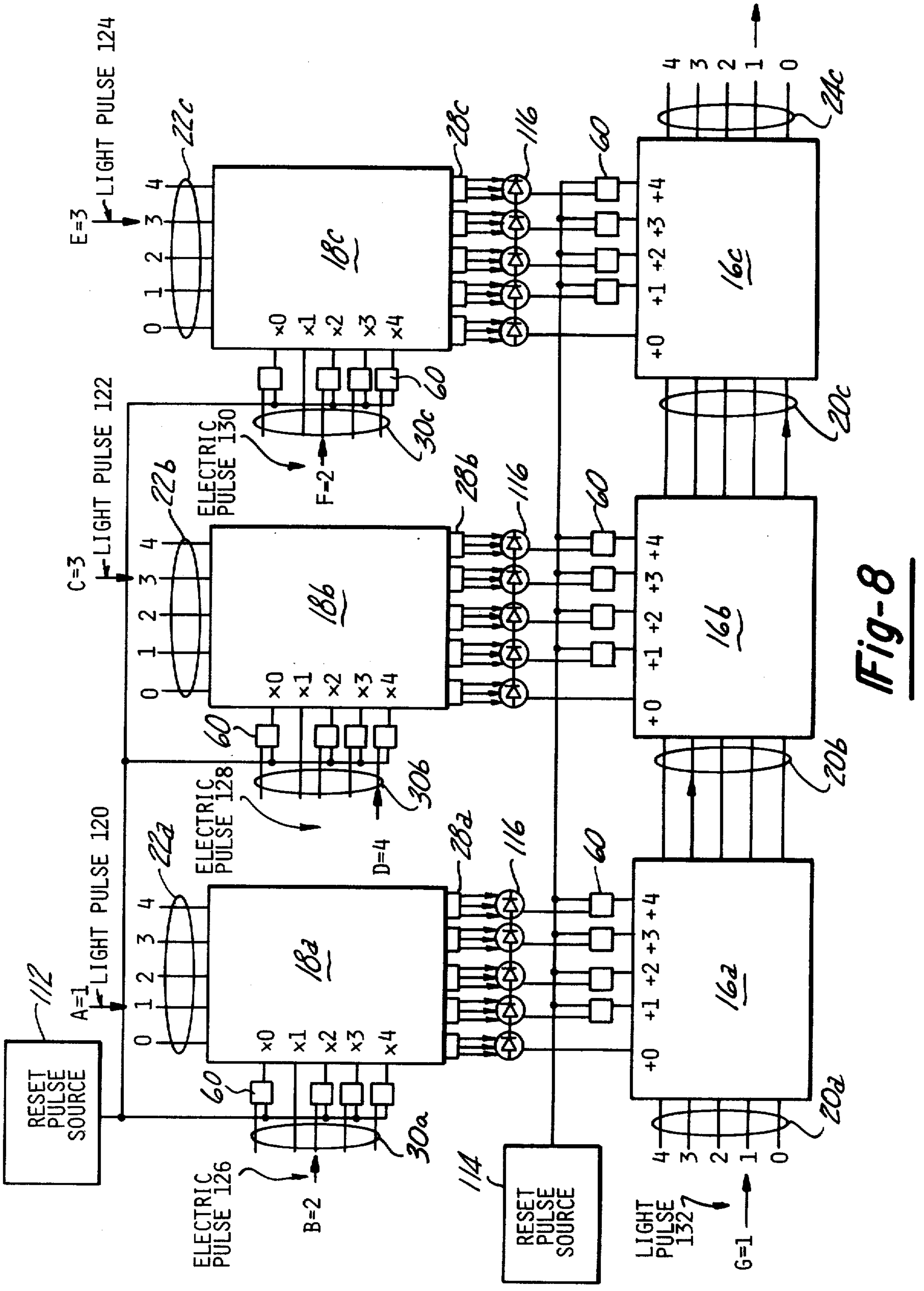
FIG. 8 is a combined schematic and diagrammatic representation of a series of addition and multiplication modules, as depicted in FIGS. 2*a* and 2*b*, interconnected to compute the function of A×B+C×D+E×F+G for modulus 5, where A=1, B=2, C=3, D=4, E=3, F=2 and G=1.
Figure 9:
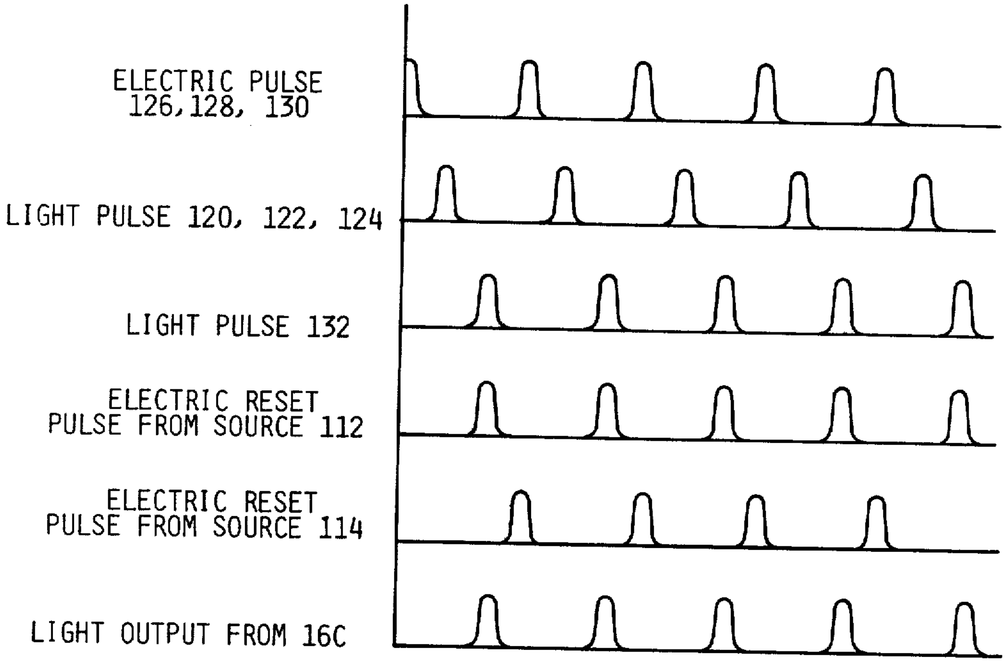
FIG. 9 is a timing diagram showing the relative time relationship between the electric and light pulses for the interconnected arrangement of modules shown in FIG. 8.
Figure 10:
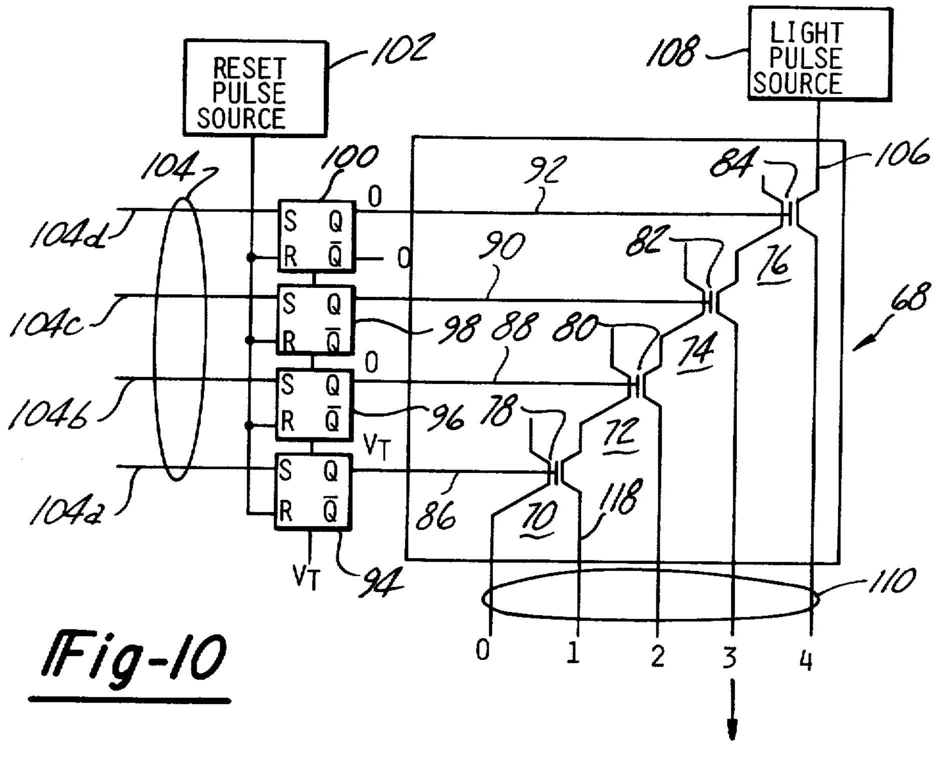
FIG. 10 is a combined schematic and diagrammatic representation of one arrangement for initially inputting light pulses into the desired input wave guides of the modules depicted in FIG. 8.

Turning attention now to FIGS. 8, 9 and 10, the addition and multiplication modules 16 and 18 described above may be interconnected in a manner to perform a sequence of additions and multiplications, as is particularly illustrated in FIG. 8 wherein the light outputs of three multiplication modules 18*a*, 18*b*, and 18*c* form the light inputs of three respectively associated addition modules 16*a*, 16*b* and 16*c*. The inputs of the interconnected arrangement of modules shown in FIG. 8 is defined by the light inputs 22*a*, 22*b* and 22*c* of the respectively associated multiplication modules 18*a*, 18*b* and 18*c*. A suitable source of light pulses for delivering such pulses to each of the light inputs 22*a*, 22*b* and 22*c* is shown in FIG. 10. The light source 68 comprises four optical light switches 70–76 similar to those discussed previously. The associated electrodes 78–84 are operably coupled via electrical lines 86–92 to the Q outputs of corresponding RS type flip-flops 94–100. The R inputs to flip-flops 94–100 are connected to a suitable source of reset pulses 102 while four program control input lines to the source 68 are connected to the S inputs of flip-flops 94–100. One wave guide of switch 76 has the input 106 thereof coupled with a suitable source of light 108. The outputs of the wave guides associated with switches 70–76 form five sources of light output on light output lines 110. One of the light sources 68 is respectively associated with each of the multiplication modules 18*a*, 18*b* and 18*c*, and the five output lines 110 of source 68 are operably coupled with the input lines of the corresponding multiplication module. Light produced at the source 108 is delivered through various optical switches 70-76 in accordance with signals received on program control line 104 in order to deliver light on a desired one of the output lines 110 for delivery to a corresponding one of the input lines 22*a*, 22*b* or 22*c* of the associated modules 18*a*-18*c*.

Referring particularly now to FIGS. 8 and 9, each of the flip-flops 60 associated with the multiplication modules 18*a*-18*c* have the reset inputs thereof connected to a first source of reset pulses 112, while each of the flip-flops 60 associated with the addition modules 16*a*-16*c* has the reset input thereof connected to a suitable source of reset pulses 114. Each of the five light outputs of the multiplication modules 18*a*, 18*b* and 18*c* are connected with the optical input of an analatch type photo sensitive diode 116, the electrical output of diode 116 forming the S inputs of flip-flops 60 associated with the addition modules 16*a*, 16*b* and 16*c*. Photo sensitive diodes 116 are operative to convert the optical energy output on the corresponding lines 28*a*-28*c* to electrical pulses which are then delivered to the set inputs of flip-flops 60.

In illustration of the operation of the interconnected arrangement of modules shown in FIG. 8, let it be assumed that it is desired to compute $A \times B + C \times D + E \times F + G$ for modulus 5 where $A=1$, $B=2$, $C=3$, $D=4$, $E=3$, $F=2$ and $G=1$. A light pulse would be caused to be delivered to the number 1 input of input lines 22*a* of module 18 corresponding to the value of A. As shown in FIG. 10, this light pulse would be produced by providing input signals on program control lines 104*b*, 104*c* and 104*d* whereby lines 88, 90 and 92 remain low to produce switching of optical switches 72, 74 and 76, and 104*a* goes high preventing switching at 70. Under these conditions, light pulses produced by source 108 are delivered through switches 72, 74 and 76 to optical switch 70. The light pulse derived from source 108 is then output on transmission path 118 and is thence delivered to the number 1 input of input lines 22*a* associated with multiplication module 18*a*. For reference purposes, the light pulse delivered to the number 1 input on input lines 22*a* will be designated as pulse 120. In a similar manner, light pulses 122 and 124 corresponding to the values $C=3$ and $E=3$ are delivered to the appropriate light inputs of multiplication modules 18*b* and 18*c*. Simultaneously, electrical pulses 126, 128 and 130, respectively corresponding to the values $B=2$, $D=4$ and $F=2$ are delivered to the appropriate program control inputs 30*a*, 30*b* and 30*c* of the corresponding modules 18*a*, 18*b* and 18*c*. A light pulse is output on one of the lines 28*a* of module 18*a* in accordance with the spatial position of the residue number corresponding to the result of the operation $A \times B$. This light pulse is delivered to the appropriate photo sensitive diode 116, where such light pulse is converted to electrical energy which is then delivered to the S input of the corresponding flip-flip 60. In a similar manner, light pulses output on the lines 28*b* and 28*c* of modules 18*b* and 18*c* correspond in spatial position to the residue number result of the operations corresponding to $C \times D$ and $E \times F$ respectively. Light pulses representative of the residue numbers computed as discussed above are delivered to the program control inputs of the addition modules 16*a*-16*c*. At this point, a first reset signal is produced by the source 112 and is delivered to the reset inputs of flip-flops 60 associated with the multiplication modules 18*a*-18*c*, thereby resetting such flip-flops to enable the modules 18*a*-18*c* to perform the next operation. As is apparent from FIG. 9, concurrent with the production of the reset pulse from source 112, a further light pulse 132 corresponding to the value $G=1$, is delivered to the appropriate light input line 20*a* of addition module 16*a*, the path of light pulse 132 is altered in accordance with the signals delivered on program control lines 28*a*, 28*b* and 28*c*.

From the foregoing, it may be appreciated that the multiplication module 18*a* performs the operation of $A \times B$, with the residue result of such computation being added to G by addition module 16*a*. Similarly, module 18*b* performs the operation of $D \times C$, and the residue result is added to the residue result of the computation $A \times B + G$ as performed by modules 16*a* and 16*b*. Finally, multiplication module 18*c* performs the computation of $E \times F$, and addition module 16*c* combines the residue results output from modules 16*b* and 16*c*. The output of module 16*c* on output lines 24*c* represents the residue number, in spatially oriented form, corresponding to the computation of $A \times B + C \times D + E \times F + G$. Each of the flip-flops 60 forming the program control inputs to the addition modules 16*a*-16*c* is reset by a pulse produced by a source 114 only after the final residue value of the computation, in light pulse form, is output on one of the lines 24*c*.

From the foregoing, it is apparent that the interconnected arrangement of computation modules shown in FIG. 8 is self-contained and eliminates the need for independent logic circuits and controls. Each of the computation modules performs addition and multiplication operations in essentially one switching time unit of a simple flip-flop device. The computation modules can therefore be easily interconnected to perform various chain calculations, since once a module has performed a given operation for one set of residue value inputs, it is free to perform a subsequent operation. Complex functions may therefore be computed with the computation modules of the present invention using parallel and pipelining structures to allow extremely fast computation rates.

Figure 11:
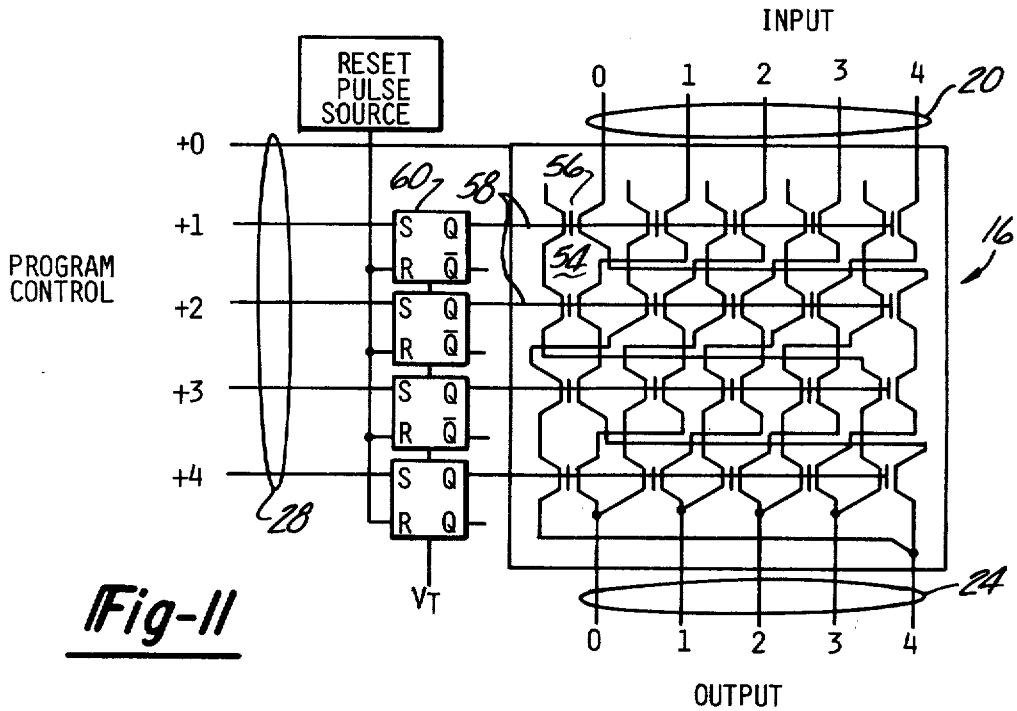
FIG. 11 is a combined schematic and diagrammatic representation of an alternate form of an addition module according to the present invention; and, FIG. 12 is a combined schematic and diagrammatic representation of an alternate form of the multiplier module of the present invention.

With respect to the embodiments of the computation modules discussed above, it was noted that a voltage is normally applied to each of the optical switches so as to prevent optical energy transfer between adjacent wave guides in each switch; i.e. the propagation of light pulses is confined to a single wave guide until the voltage of one of the light switches is reduced. The computation modules may be programmed, however, so as to normally prevent optical switching of the light pulses when the applied voltage to the optical switches is at a reduced, or zero level, and to effect optical energy transfer between adjacent wave guides when such voltage level is increased to a prescribed magnitude. Thus, as shown in FIG. 11, an alternate form of the addition computational module for modulus 5 is shown, wherein the optical pathways interconnecting the various optical switches is obviously different from that depicted in FIG. 5. Additionally, the electrical control lines 58 are connected to the Q, rather than the $\overline{Q}$ outputs of the associated flip-flop 60. The operation of the computational module shown in FIG. 11 is identical to that of the module shown in FIG. 5, the only difference being that each of the electrodes 56 of the optical switches 54 is maintained at a low or zero voltage until such time as a control signal is received on the corresponding program control input line 28.

Figure 12:
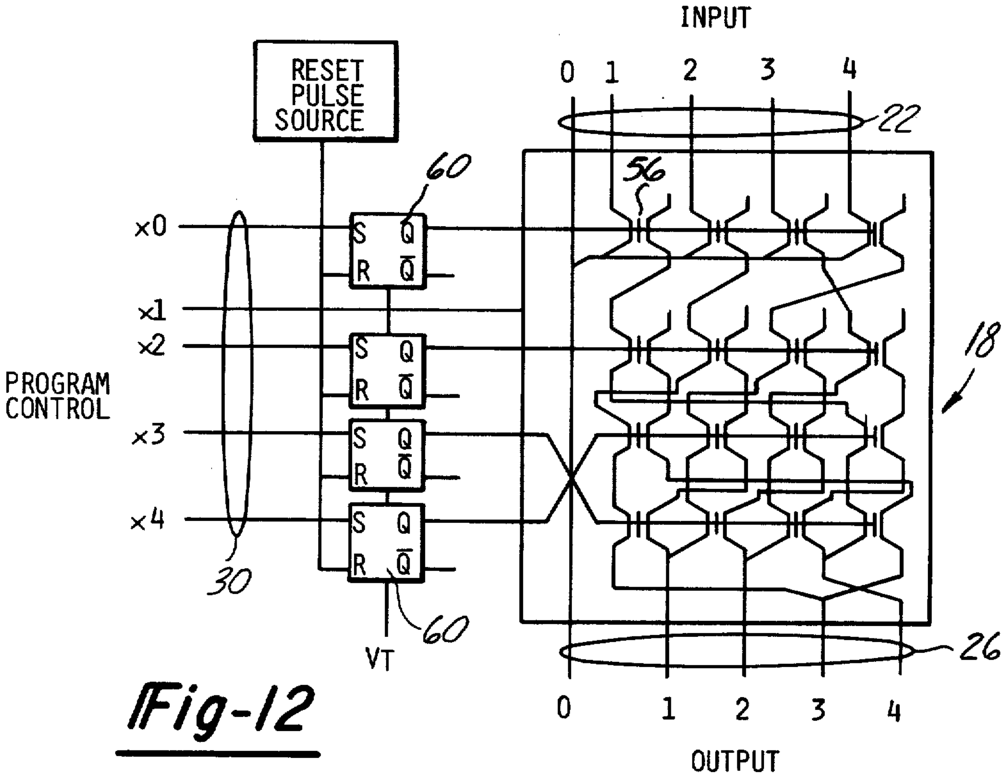

A multiplication computation module for modulus 5 in which the electrodes 56 are normally held at zero potential so as to prevent optical energy transfer between adjacent wave guides, is shown in FIG. 12.

From the foregoing, it can be appreciated that the output, input and program controls of the computational modules described above are all represented similarly in the form of spatial positions. This feature allows direct interconnection of the computational modules using the output of one module to program the function of the next downstream computation module. The modules are programmed using an electrical pulse while computations are made using the propagation of light pulses. Although examples of computation modules have been disclosed for modulus 5, the overall concepts disclosed herein are equally applicable to any modulus. Computation modules for moduli other than modulus 5 will simply result in the use of a different number of optical switches than that disclosed herein, the total number of optical switches being required being defined by $M_i(M_i-1)$, where $M_i$ is the modulus.

If desired, the flip-flops associated with each computation module may be biased in favor of the set input thereof to allow the set and reset pulses to occur at the same time such that computations can be speeded up even further.

Thus, the computation module described above not only provides for the reliable accomplishment of the object of the invention, but does so in a particularly simple and effective manner. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

Having thus described the invention, what is claimed is:

1. A computation module for generating an arithmetic function of two residues in the residue number system, comprising an array of light switches arranged in rows and columns, each of said light switches including an input for receiving light and an output for delivering light and being switchable between first and second light transmitting states for altering the path of light traveling therethrough; light transmission paths interconnecting each of the outputs of the light switches in one row with the inputs of light switches in a successive row to define a plurality of light transmitting channels through said module; first input means operably coupled with at least one of the light switches in the first row of the array for inputting a light signal into the input of said one switch as a function of a first of the residues; a plurality of means operably coupled with at least certain of the rows of the array for simultaneously switching the state of all of the light switches in said certain rows of the array; and means operably coupled with said means for simultaneously switching and controlled by the second residue for actuating one of said means for switching all of the light switches in said certain of the rows of the array, whereby said light input signal is channeled through the array and outputs from a light switch in a successive row of the array at a position which is a function of the two residue numbers.

2. The computation module of claim 1, wherein each of said plurality of means for simultaneously switching include a bistable electrical device.

3. The computation module of claim 1, wherein each light switch is electrically switchable.

4. The computation module of claim 3, wherein each light switch constitutes a directional wave guide coupler.

5. The computation module of claim 1, wherein the function generated by the module is the sum of the two residue numbers.

6. The computation module of claim 1, wherein the output function generated by the module is the product of the two input residues.

7. The computation module of claim 1, wherein the two residues are modulo M and the array consists of $M \times N$ light switches arranged in M rows of N columns.

8. The computation module of claim 1, wherein said means for simultaneously switching includes a bi-stable electrical device coupled with the associated row of light switches in the array, said device being interconnected to all of the light switches in its associated row so as to cause each of said light switches in said associated row to assume the same light transmitting state in accordance with the state of the corresponding bi-stable electrical device.

9. The computation module of claim 1, wherein the light switches and light transmission paths are arranged as a planar array with the light transmission paths crossing one another at right angles.

10. A computation module for generating an arithmetical function of two numerical representations of modulo M residues in the residue number system comprising: an array of two input, two output, electrically actuated optical switches arranged in an array of M rows and N columns; optical interconnections between each of the outputs of each of the switches in each row and inputs of the switches in a succeeding row; a plurality of electrical switching devices respectively associated with at least certain of the rows of the array, each of said switching devices being interconnected with each of the optical switches in the respectively associated row; means for delivering electrical signals to the electrical switching devices, each of said switching devices being responsive to said electrical signals to assume a state that differs from that of the other electrical switching devices as a function of one of the residue number representations; and means for injecting a light signal into one of the inputs of one of the switches in the first row of the array as a function of the other of the residue number representations, whereby a light signal will be produced at the output of one of the light switches forming the last row of the array, the particular switch from which said light signal is output being a function of the residue representation of the function of the two input residue representations.

11. The computation module of claim 10 in which the optical switches constitute directional wave guide couplers.

12. The computation module of claim 10 in which the output represents a product of the inputs.

13. The computation module of claim 10 in which the output represents the sum of the inputs.

14. The computation module of claim 10, wherein the module is formed on a single planar substrate with the optical interconnections crossing one another at right angles.

* * * * *